United States Patent

Press

[11] 4,393,923
[45] Jul. 19, 1983

[54] CONTOUR-ADAPTIVE ATMOSPHERIC HEAT EXCHANGE APPARATUS

[76] Inventor: Jack J. Press, 17426 Plaza Destacado, San Diego, Calif. 92128

[21] Appl. No.: 183,490

[22] Filed: Sep. 2, 1980

[51] Int. Cl.³ .................. F28F 3/12; F28F 21/06; F24J 3/02
[52] U.S. Cl. .................. 165/46; 126/426; 165/DIG. 10
[58] Field of Search ............. 165/46, 170, DIG. 10; 126/426

[56] References Cited

U.S. PATENT DOCUMENTS

| | | | |
|---|---|---|---|
| 2,427,262 | 9/1947 | Delano | 126/426 X |
| 3,105,708 | 10/1963 | Esty | 165/46 X |
| 3,129,754 | 4/1964 | Menzel | 165/170 X |
| 3,830,676 | 8/1974 | Elkins | 165/46 X |
| 4,036,209 | 7/1977 | Press | 126/426 X |
| 4,149,541 | 4/1979 | Gammons et al. | 165/46 X |
| 4,230,175 | 10/1980 | Disselbeck et al. | 165/170 X |
| 4,279,294 | 7/1981 | Fitzpatrick et al. | 165/46 X |

FOREIGN PATENT DOCUMENTS

| | | | |
|---|---|---|---|
| 2722613 | 12/1977 | Fed. Rep. of Germany | 126/426 |
| 1213123 | 11/1970 | United Kingdom | 165/46 |

Primary Examiner—Sheldon J. Richter
Attorney, Agent, or Firm—Robert F. Beers; Ervin F. Johnston; Thomas Glenn Keough

[57] ABSTRACT

An atmospheric heat exchange apparatus constructed from two thin polymeric films is provided which can be mounted for operation on contoured surfaces. Heat is transferred between the atmosphere and a liquid medium flowing between the sheets. The apparatus can be mounted with no operational degradation resulting from flow-inhibiting bends in the polymeric films.

2 Claims, 7 Drawing Figures

FIG.1
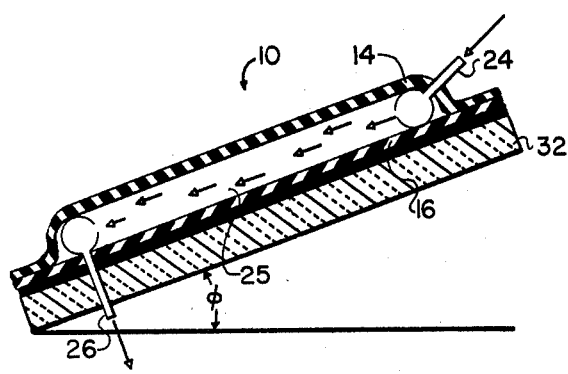
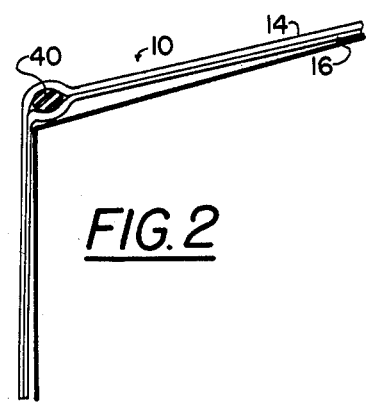
FIG.2
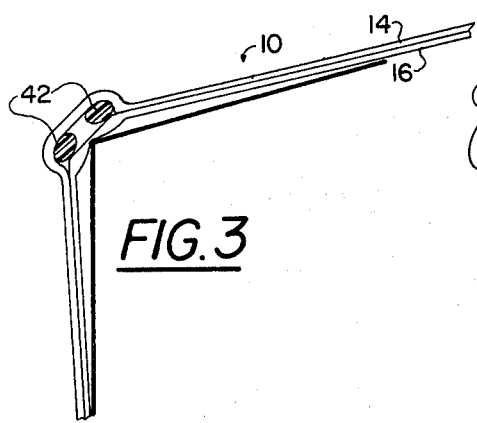
FIG.3
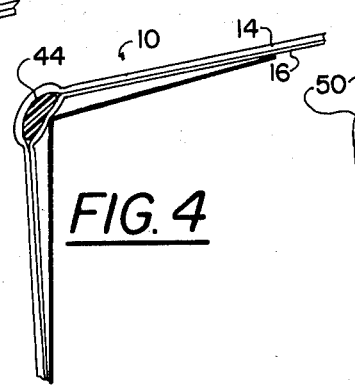
FIG.4
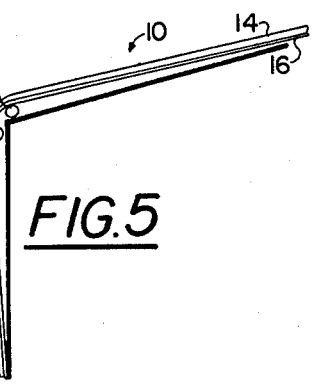
FIG.5
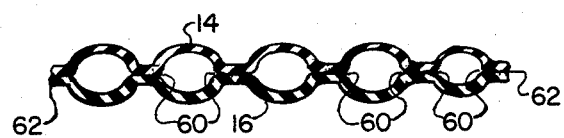
FIG.7
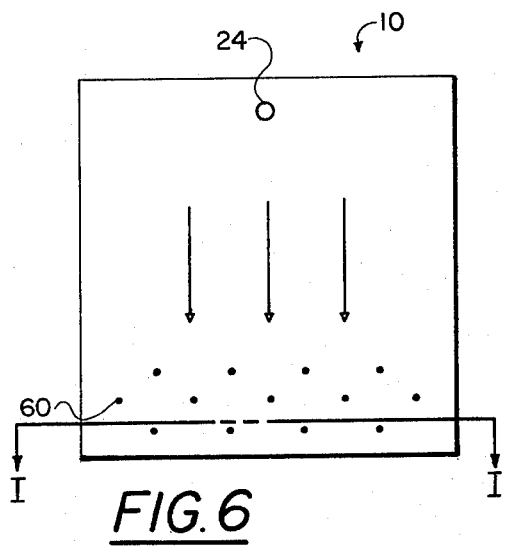
FIG.6

4,393,923

CONTOUR-ADAPTIVE ATMOSPHERIC HEAT EXCHANGE APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an atmospheric heat exchange apparatus which is constructed of thin sheets of polymeric material to provide a heat exchange surface for a liquid medium. More particularly, it relates to a supple heat exchanger which has the ability to conform to a great variety of surfaces upon which it may be mounted.

An atmospheric heat exchange method and apparatus was described in U.S. Pat. No. 4,036,209, issued to the Inventor on July 9, 1977. That exchanger is constructed of two thin pliable, polymeric film panels, bonded together at their edges, between which flows a liquid medium. Heat exchange between the liquid medium and the atmosphere occurs when either or both panels are exposed to the atmosphere. Operational installations of that exchanger are limited to single-plane surfaces. If the exchanger is installed so that it lays over an edge defined by the intersection of two plane surfaces, for example, over the edge of a roof, the flow of liquid between the two sections defined by the edge can, under certain circumstances, be severely restricted. Since the efficient operation of the exchanger depends upon rapid flow of the liquid medium, interruption of the flow reduces the operability of the apparatus.

SUMMARY OF THE INVENTION

An efficient, contour-adaptable, atmospheric heat transfer apparatus is proposed which can be mounted on a variety of surfaces for exchange of heat between the atmosphere and a liquid medium contained within the apparatus. The apparatus comprises a container constructed from two thin polymeric films connected at their edges to provide a space for constraining and directing a flow of a liquid medium which exchanges heat with the atmosphere through whichever film may be exposed to the atmosphere. The films are also bonded in a noncontinuous pattern within the space of the container through which the liquid medium must pass. The noncontinuous bonding reduces bulging in the container caused by the inhibition of liquid flow. Spacers are provided to relieve the effects of tension or compression concentrations where bends may be induced into the container by edges in the mounting surface.

STATEMENT OF THE OBJECTS OF THE INVENTION

An object of this invention is to provide a contour-adaptable atmospheric heat transfer apparatus which can operate at maximym efficiency while mounted on any of variety of surfaces.

Other objects, advantages and novel features of the invention will become apparent from the following detailed description of the invention when taken together with the accompanying drawings.

BRIEF DESCRIPTION OF THE DRAWINGS

FIG. 1 is a longitudinal, sectional view of the heat exchanger mounted on a representative surface.

FIGS. 2, 3, and 4 are all sectional views of bends in the heat transfer apparatus showing the placement of internal spacers intended to reduce the effects of tension or compression buildups at bends.

FIG. 5 is a cross-sectional view of a bend in the heat transfer apparatus showing the use of removable external spacers to relieve tension or compression buildups at the bend.

FIG. 6 is a front elevational view of the heat transfer apparatus showing a pattern of noncontinuous on one side of a bend in the apparatus.

FIG. 7 is a horizontal cross-sectional view taken along plane I—I of FIG. 6.

DESCRIPTION OF THE PREFERRED EMBODIMENTS

Referring to the drawings where similar reference numerals refer to equivalent parts throughout the figures, there is shown in FIG. 1 one atmospheric heat exchange apparatus of a type described in U.S. Pat. No. 4,036,209. It consists of panel 10 which is constructed of two thin polymeric film walls 14 and 16 which are heat sealed on their edges. Films 14 and 16 form a liquid container having an inlet 24 through which a liquid medium 25 is admitted and an outlet 26 through which the liquid medium exits. The entire panel 10 is supported by a sheet of insulation material 32. As explained in the referenced patent, negative pressure within the container results from a negative suction created by the flow of liquid. The negative pressure draws walls 14 and 16 toward each other to reduce the thickness of the container which increases the velocity of the liquid medium and uniformly distributes the liquid throughout the container. Due to the thinness of film 14, heat is efficiently transferred between the liquid medium flowing in the container and the atmosphere to which the film is exposed.

Operation of the Inventor's atmospheric heat exchange apparatus can be affected by the shape of the surface upon which it is installed. Particularly, when the surface has an edge over which a section of the heat exchange apparatus extends, constriction of the container may occur at a bend in the apparatus at the site of the edge which will reduce the liquid flow. In normal sunny use, operation may be satisfactory. Heat collected from the atmosphere will cause the exchanger to expand and to loosen at the bend. Water flow over the bend in the exchanger is not interrupted and the flow suction on the downside of the bend efficiently removes the liquid at the bend as fast as it is delivered. However, in cold weather or at night shrinkage of the heat exchanger material can cause concentration of tension or compression at the bend and result in flow restraint downside of the bend. When the heat exchanger is turned on under such cold conditions with no preestablished downside suction, a high flow rate can cause the liquid to build up much more rapidly at the bend than it is removed. Water accumulation on the upside portion of the heat exchanger can bulge the exchanger and cause a buildup of pressure on the side seals or a sudden release of a large volume of water to the downside of the heat exchanger. Under such circumstances the side seals may break or the sudden flow of liquid can damage the lower portion of the heat exchanger.

Variations of a device to compensate for the accumulation of compression or tension at bends in the heat exchanger are shown in FIGS. 2, 3, and 4. In FIG. 2 the heat exchanger 10 is shown installed on a surface with a sharp drop-off over which a portion of the exchanger hangs. This may be, for example, on the roof of a structure. An internal porous flow spacer 40, inserted in the flow container of heat exchanger 10 is positioned directly above the edge in the mounting surface. By positioning the porous flow spacer 40 inside the flow container in the proximity of the bend, the two films comprising the container are prevented directly contacting one another at the bend. A very small flow space is adequate to prevent build up of the liquid medium, for example, 0.125 inches.

The porous flow spacer 40 may be made of any semi-rigid or rigid porous material in tube, rod, or strip form and positioned across the width of the container at the bend. Suitable members include perforated plastic or metal tubing, threaded or grooved rod, coiled springs, rigid woven tubing, strips of porous foam, or any equivalent. In one installation, illustrated in FIG. 3, two rigid porous woven tubes 42 spaced one to two inches apart in the flow container were mounted so that one tube was positioned on each side of a 75° bend. With this variation, when the container shrank in length, the tension separated the two films at the bend. FIG. 4 illustrates the spacer 44 fabricated from, for example, a porous foam, which is placed within a bend over the edge of the mounting surface.

FIG. 5 illustrates a method for alleviating tension build-up within the exchanger at a bend site. Spacers 50, such as plastic pipe, are positioned directly on both sides of a bend, the exchanger is mounted, and the spacers are then removed. This provides slack at the bend so there is no external tension and flow restraint. The diameter of the pipe will depend upon the exchanger installation and the coefficient of shrinkage of the plastic.

FIGS. 6 and 7 illustrate a method of spot sealing the plastic films which can be used alone or as a complement to the compression relief methods described hereinabove. In FIG. 6 the liquid medium is introduced into the heat exchanger at inlet port 24, flow of liquid is in the direction of the arrow, and a bend in the heat exchanger 10 occurs at its lower edge. A discontinuous pattern of spot heat seals 60 throughout and across the width of the exchanger 10 in the length directly above the bend provides bulge resistance. Thus, in starting operation under cold conditions, a short-term, instanteous head of liquid accumulates above the bend to force the liquid over the bend and assist in forming the flow vacuum.

FIG. 7 illustrates this technique with a cross-sectional view of the liquid container of the exchanger taken horizontally. Upper film 14 and lower film 16 are bonded together at outer edges 62 to form the panel. Spot seals 60 bond the upper and lower films together in a noncontinuous pattern to provide space for the liquid medium to flow through.

The spot seals have additional benefits and may be used the entire length of the exchanger. For example, in the manufacture of long, large exchangers, the seals can be helpful to simplify handling and maintain optimum uniformity of alignment of two opposing plastic films or flexible sheets. Additionally, the seals provide points at which the exchanger can be fastened to the surface on which it is to be installed. With the tension reduction technique illustrated in FIG. 5, fastening the exchanger at spot seals across the width immediately below and above the bend will eliminate sag and maintain slack at the bend when the external spacers 50 are removed.

With the improvements, additions, and modifications described hereinabove, the inventor's atmospheric heat exchange method and apparatus described in U.S. Pat. No. 4,036,209 becomes a highly efficient contour-adaptive heat exchange apparatus which can be effectively installed on a variety of surfaces having noncontinuous contours. The exchanger may be customized in length and width to provide an optimum configuration for any desired installation in a great variety of operating conditions.

Obviously, many modifications and variations of the present invention are possible in the light of the above teachings. It is to be understood that within the scope of the appended claims the invention may be practiced otherwise than as specifically described.

What is claimed is:

1. An atmospheric heat transfer apparatus which is capable of bending over structures, said apparatus consisting of:

a sealed container having front and rear walls which are made of thin, pliable sheet material which have smooth inner surfaces capable of contacting each other over substantially their entire inner surfaces so as to provide a planar liquid passageway therebetween;

said container having an inlet and an outlet for the liquid so that the inlet can be positioned above the outlet to cause the liquid to flow by gravity and cause a negative pressure within the container which draws the container walls toward one another with only the liquid flowing therebetween; and means for relieving compression contact between the container walls where any bend occurs in the container, the compression contact relieving means being located only where such bend occurs.

2. An apparatus as claimed in claim 1 consisting of:
the compression relieving means being a porous spacer which is located within the container at a bend.

* * * * *